US011673982B2

(12) United States Patent
Lepo et al.

(10) Patent No.: US 11,673,982 B2
(45) Date of Patent: Jun. 13, 2023

(54) SURFACE SIZING COMPOSITION, METHOD OF PRODUCTION, AND USE THEREOF

(71) Applicant: Kemira Oyj, Helsinki (FI)

(72) Inventors: Anneli Lepo, Espoo (FI); Tarja Turkki, Espoo (FI); Elsi Turunen, Espoo (FI)

(73) Assignee: KEMIRA OYJ, Helsinki (FI)

(*) Notice: Subject to any disclaimer, the term of this patent is extended or adjusted under 35 U.S.C. 154(b) by 0 days.

(21) Appl. No.: 17/557,247

(22) Filed: Dec. 21, 2021

(65) Prior Publication Data

US 2022/0195086 A1 Jun. 23, 2022

Related U.S. Application Data

(62) Division of application No. 16/499,302, filed as application No. PCT/EP2018/058117 on Mar. 29, 2018, now Pat. No. 11,242,423.

(30) Foreign Application Priority Data

Mar. 30, 2017 (SE) .................................... 1750380.6

(51) Int. Cl.
| | |
|---|---|
| *D21H 17/35* | (2006.01) |
| *C08F 212/08* | (2006.01) |
| *C08F 220/18* | (2006.01) |
| *C08F 2/22* | (2006.01) |
| *C08L 3/02* | (2006.01) |
| *D21H 17/37* | (2006.01) |
| *D21H 17/66* | (2006.01) |
| *D21H 19/22* | (2006.01) |
| *D21H 19/64* | (2006.01) |
| *D21H 21/16* | (2006.01) |

(52) U.S. Cl.
CPC .............. *C08F 212/08* (2013.01); *C08F 2/22* (2013.01); *C08F 220/1804* (2020.02); *C08L 3/02* (2013.01); *D21H 17/35* (2013.01); *D21H 17/37* (2013.01); *D21H 17/66* (2013.01); *D21H 19/22* (2013.01); *D21H 19/64* (2013.01); *D21H 21/16* (2013.01)

(58) Field of Classification Search
CPC ........ D21H 21/16; D21H 17/36; D21H 19/64; D21H 17/66; D21H 19/22; D21H 17/37; D21H 17/35; C08F 220/1804; C08F 2/22; C08F 212/08; C08L 3/02

USPC ....................................................... 162/164.6
See application file for complete search history.

(56) References Cited

U.S. PATENT DOCUMENTS

| | | |
|---|---|---|
| 2002/0040088 A1 | 4/2002 | Hauschel et al. |
| 2012/0083563 A1 | 4/2012 | Song et al. |
| 2013/0184407 A1 | 7/2013 | Peuranen et al. |

FOREIGN PATENT DOCUMENTS

| | | |
|---|---|---|
| CA | 1052519 A | 4/1979 |
| CN | 10226101 A | 11/2011 |
| DE | 19806745 A1 | 8/1999 |
| EP | 1981630 A1 | 10/2008 |
| WO | WO-0044983 A1 | 8/2000 |
| WO | WO2017093368 A1 | 6/2017 |
| WO | WO2017115012 A1 | 7/2017 |

OTHER PUBLICATIONS

Iselau et al: "Role of the aggregation behavior of hydrophobic particles in paper surface hydrophobation", Colloids and Surfaces A: Physiochemical And Engineering Aspects, Elsevi Er, Amsterdam, NL, vol. 483, Apr. 22, 2015 (Apr. 22, 2015), pp. 264-270, XP029269615, ISSN: 0927-7757, DOI: 10.1016/J.COLSURFA. 2015.04.013.

International Search Report for Application No. PCT/EP2018/058117 dated May 25, 2018.

*Primary Examiner* — Mark Halpern
(74) *Attorney, Agent, or Firm* — Moser Taboada

(57) ABSTRACT

A method of producing a surface sizing composition, the method comprising: providing a metal salt having at least 3 valence electrons, wherein the metal salt is selected from the group of aluminium sulfate, aluminium chloride, aluminium nitrate, polyaluminium sulfate (PAS), polyaluminium chloride (PAC), and polyaluminium chloride sulfate (PACS), polyaluminium formiate, polyaluminium nitrate, and any combination thereof; providing an aqueous polymer dispersion, wherein the aqueous polymer dispersion is an aqueous polymer dispersion (A) and an aqueous prepolymer composition (B), wherein the aqueous polymer dispersion (A) is obtainable by free radical emulsion copolymerizing a first ethylenically unsaturated monomer blend, and wherein the aqueous prepolymer composition (B) is obtainable by free radical emulsion copolymerizing in a polymerization solvent comprising C1-6-carboxylic acid and C1-6-carboxylic acid anhydride, a second ethylenically unsaturated monomer blend; and mixing the metal salt and the aqueous polymer dispersion to provide a surface sizing composition to be used in papermaking.

8 Claims, 1 Drawing Sheet

SURFACE SIZING COMPOSITION, METHOD OF PRODUCTION, AND USE THEREOF

CROSS-REFERENCE TO RELATED APPLICATION

This application is a divisional of co-pending U.S. patent application Ser. No. 16/499,302, filed Sep. 29, 2019, which is the National Stage of International Patent Application No. PCT/EP2018/058117, filed Mar. 29, 2018, which claims the benefit of priority to Swedish Patent Application No. 1750380.6, filed Mar. 30, 2017, the contents of each of which are incorporated herein by reference in their entireties.

FIELD OF THE INVENTION

The present invention relates to surface sizing chemicals, production methods and uses within papermaking.

BACKGROUND

Sizing agents are widely used in the paper industry. Sizing is used to change the characteristics of the obtained paper materials. By addition of sizing agent absorption and wear characteristics may change. The obtained paper product may obtain a change in hydrofobation.

Sizing agents may be added during the production of the material so that they may either be incorporated into the paper structure as internal sizing agents or applied to the surface of the paper product being produced as surface sizing agent. Internal sizing chemicals are preferably added in the wet end of the papermaking process, e.g. together with the fibers. Internal sizing chemicals are present throughout the paper material and thus more may need to be added compared to use of surface sizing agents. Surface sizing agents are provided to improve the surface strength, printability, and water resistance of the material to which it is applied.

Compounds that may be used as sizing agents are not always compatible with other additives or sizing agents. Thus, separate dosing points of such incompatible components may be required. The use of separate dosing points may not be feasible for all paper producers due to limitations in available space in and around the process equipment.

There is a need for new ways to efficiently provide sizing agents to the paper production process and new sizing agent compositions.

SUMMARY OF THE INVENTION

The present invention provides a surface sizing composition which is storage stable. Conventional surface sizing compositions are not able to provide a one component formula including a metal salt. Conventional systems may be fixed in the type of equipment used and there may not be enough space for modifications and inclusion of additional apparatuses. Paper mills which have limiting space may not be able to utilize new technology requiring equipment modifications. Thus, the present invention provides an attractive improvement for paper mills as no additional equipment is needed as the polymeric composition and metal salt are compatible and may be provided as a one component mixture, as the components are not required to be kept a part in separate apparatuses and addition points. The improvements in equipment use involves less costs for equipment and less space in the paper machine is required, as additional apparatuses are not needed.

SHORT DESCRIPTION OF THE DRAWINGS

Figure 1:
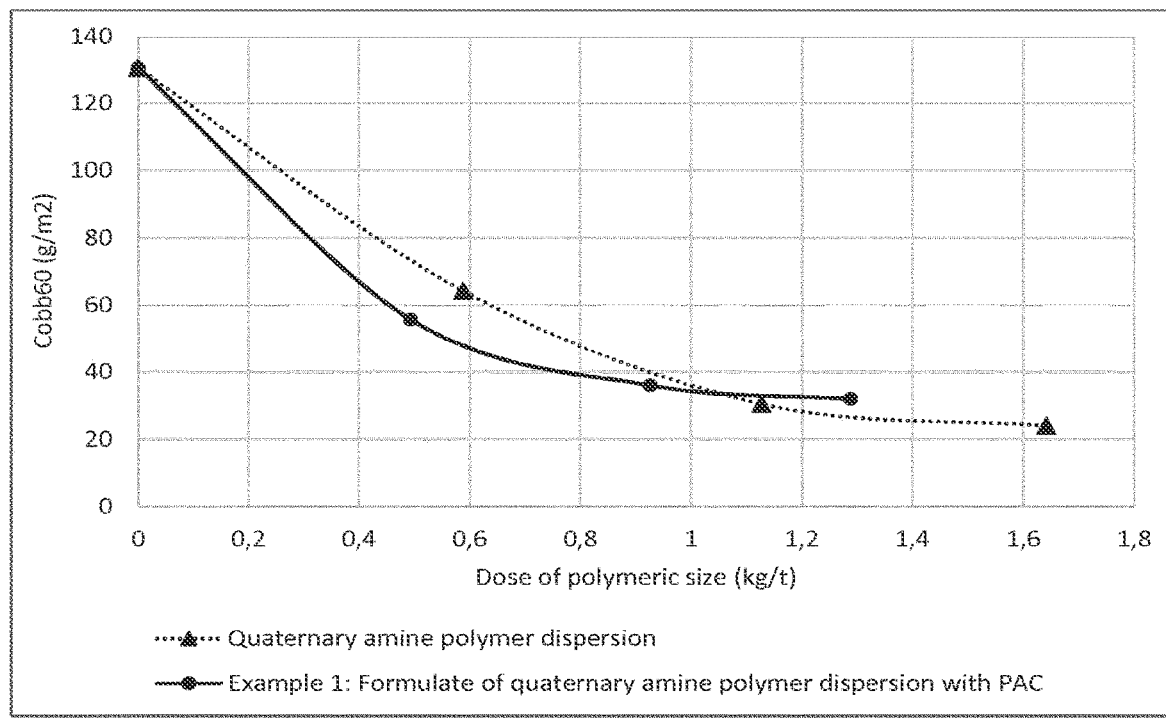
FIG. 1 shows sizing results of the quaternary amine polymer dispersion, and the formulate of the quaternary amine polymer dispersion with polyaluminium chloride (PAC). PAC dose is not included in the dose calculation of the polymeric size.

The lower the Cobb value the better the sizing performance.

DETAILED DESCRIPTION

The present invention relates to a surface sizing composition comprising a metal salt, wherein the metal has at least 3 valence electrons, and an aqueous polymer dispersion.

The present invention further relates to a method of producing said surface sizing composition, comprising the steps of:
providing a metal salt, the metal having at least 3 valence electrons,
providing an aqueous polymer dispersion,
mixing said metal salt and polymer dispersion to provide a surface sizing composition to be used in papermaking.

The aqueous polymer dispersion is an aqueous polymer dispersion (A) obtainable by free radical emulsion copolymerizing a first ethylenically unsaturated monomer blend comprising
(a) 0 to 75% by weight of at least one optionally substituted styrene,
(b) 15 to 100% by weight of at least one C1-C4-alkyl (meth)acrylate, and
(c) 0 to % by weight of other ethylenically unsaturated copolymerizable monomers,
wherein the sum (a)+(b)±(c) is 100%,
in the presence of a first free radical initiator and
an aqueous prepolymer composition (B) obtainable by free radical emulsion copolymerizing, in a polymerization solvent comprising C1-C6-carboxylic acid and C1-6-carboxylic anhydride a second ethylenically unsaturated monomer blend comprising
(i) 5 to 50% by weight of at least one ethylenically unsaturated quaternary amine selected from quaternary salt of N,N,N-tri(C1-C4-alkyl)amino C1-C4-alkyl (meth)acrylate with a mineral acid or an organic acid and/or quaternary salt of N,N,N-tri(C1-C4-alkyl)amino C1-C4-alkyl(meth)acrylamide with a mineral acid or an organic acid,
(ii) 0 to 40% by weight of at least one ethylenically unsaturated tertiary amine selected from N,N-di(C1-C4-alkyl)amino C1-C4-alkyl(meth)acrylate and/or N,N-di(C1-C4-alkyl)amino C1-C4-alkyl(meth)acrylamide,
(iii) 10 to 95% by weight of at least one optionally substituted styrene,
(iv) 0 to 50% by weight of at least one C1-C4-alkyl (meth)acrylate, and
(v) 0 to 10% by weight of other ethylenically unsaturated copolymerizable monomers,
wherein the sum (i)+(ii)+(iii)+(iv)+(v) is 100%,
in the presence of a second free radical initiator, and adding water to the obtained polymer composition to obtain the aqueous prepolymer composition.

The present aqueous polymer dispersion (A) may be obtained by emulsion polymerization of a first ethylenically unsaturated monomer blend in the presence of an aqueous prepolymer composition (B). This stage is herein referred to as the second polymerization stage.

The aqueous prepolymer composition (B) may be prepared from a second ethylenically unsaturated monomer blend comprising, in particular, (i) at least one ethylenically unsaturated quaternary amine selected from quaternary salt of N,N,N-tri(C1-C4-alkyl)amino C1-C4-alkyl(meth)acrylate with a mineral acid or an organic acid and/or quaternary salt of N,N,N-tri(C1-4-alkyl)amino C1-C4-alkyl(meth)acrylamide with a mineral acid or an organic acid, in the presence of a (second) polymerization initiator in a polymerization solvent comprising C1-C6-carboxylic acid and C1-C6-carboxylic acid anhydride. This stage is herein referred to as the first polymerization stage.

Accordingly further provided herein is a process for the preparation of an aqueous polymer dispersion as defined herein and hereafter, comprising free radical emulsion polymerizing, in a polymerization solvent comprising C1-C6-carboxylic acid and C1-C6-carboxylic acid anhydride, in the presence of a second free radical initiator, a second ethylenically unsaturated monomer blend comprising (i) 5 to 50% by weight of at least one ethylenically unsaturated quaternary amine selected from quaternary salt of N,N,N-tri(C1-C4-alkyl)amino C1-C4-alkyl (meth)acrylate with a mineral acid or an organic acid and/or quaternary salt of N,N,N-tri(C1-C4-alkyl)amino C1-C4-alkyl(meth)acrylamide with a mineral acid or an organic acid, (ii) 0 to 40% by weight of at least one ethylenically unsaturated tertiary amine selected from N,N-di(C1-C4-alkyl)amino C1-C4-alkyl(meth)acrylate and/or N,N-di(C1-C4-alkyl)amino C1-C4-alkyl(meth)acrylamide, (iii) 10 to 95% by weight of at least one optionally substituted styrene, (iv) 0 to 50% by weight of at least one C1-C4-alkyl (meth)acrylate, and (v) 0 to 10% by weight of other ethylenically unsaturated copolymerizable monomers, wherein the sum (i)+(ii)+(iii)+(iv)+(v) is 100%, adding water to the obtained polymer composition to obtain an aqueous prepolymer composition (B) and copolymerizing in the presence of said aqueous prepolymer composition (B) and a water-soluble redox system comprising a first free radical initiator for the free radical emulsion copolymerization a first ethylenically unsaturated monomer blend comprising (a) 0 to 75% by weight of at least one optionally substituted styrene, (b) 15 to 100% by weight of at least one C1-C4-alkyl (meth)acrylate, and (c) 0 to 10% by weight of other ethylenically unsaturated copolymerizable monomers, wherein the sum (a)+(b)±(c) is 100% to obtain an aqueous polymer dispersion (A).

The amount of monomer(s) of group (i) is up to 50% of the total weight of the second ethylenically unsaturated monomer blend. Typically the amount of monomer(s) of group (i) is 10 to 40%, preferably 15 to 30% of the total weight of the second ethylenically unsaturated monomer blend.

The second ethylenically unsaturated monomer blend may also comprise up to 40% by weight of monomer(s) of group (ii) of the total weight of the second ethylenically unsaturated monomer blend, e.g. at least one ethylenically unsaturated tertiary amine selected from N,N-di($C_{1-4}$-alkyl) amino $C_{1-4}$-alkyl(meth)acrylate and/or N,N-di($C_{1-4}$-alkyl) amino $C_{1-4}$-alkyl(meth)acrylamide. However, the presence of unsaturated tertiary amine monomers is not required for obtaining the desired sizing properties and/or particle size. Thus the presence of (ii) is not required in the prepolymer composition, but is tolerated. Preferably the amount of monomer(s) of group (ii) is 0-15% by weight, most preferably 0%. When (ii) is present in the prepolymer composition, the amount of (ii) should not exceed that of (i). Thus the ratio of (i) and (ii) is preferably 1:<1.

The second ethylenically unsaturated monomer blend further comprises 10 to 95% by weight of monomer(s) of group (iii) of the total weight of the second ethylenically unsaturated monomer blend. Preferably the amount of monomer(s) of group (iii) is 60 to 80% of the total weight of the second ethylenically unsaturated monomer blend.

The second ethylenically unsaturated monomer blend may also comprise up to 50% by weight of monomer(s) of group (iv) of the total weight of the second ethylenically unsaturated monomer blend. However the presence monomers of group (iv) is not required. Thus, preferably the amount of monomer(s) of group (iv) is 0%.

The second ethylenically unsaturated monomer blend may also comprise up to 10% by weight of monomer(s) of group (v) of the total weight of the second ethylenically unsaturated monomer blend. However the presence monomers of group (v) is not required. Thus preferably the amount of monomer(s) of group (v) is 0%.

In the first polymerization stage, monomers (1) to (v) are polymerized by a solution polymerization method in a polymerization solvent which may also comprise water. This water is typically comprised in the monomer starting materials. Examples of C1-C6-carboxylic acids include formic acid, acetic acid, propionic acid, and butyric acid. Preferred C1-C6-carboxylic acid is acetic acid. C1-C6-monocarboxylic acids and saturated C1-C6-dicarboxylic acids may be used, saturated C1-C6-monocarboxylic acids preferably being used. The saturated C1-C6-carboxylic acids may optionally carry further substituents such as hydroxyl groups. The solution polymerization is preferably carried out in formic acid, acetic acid, propionic acid, butyric acid, isobutyric acid, valeric acid, isovaleric acid, caproic acid, hydroxypropionic acid or hydroxybutyric acid. Mixtures of different saturated C1-C6-carboxylic acids may also be used. The solution polymerization is preferably carried out in formic acid, acetic acid, propionic acid or hydroxypropionic acid, particularly preferably in acetic acid. Examples of C1-C6-carboxylic anhydrides include formic anhydride, acetic anhydride, propionic anhydride, and butyric anhydride. The anhydrides may also carry substituents such as hydroxyl groups. Preferred C1-C6-carboxylic anhydride is acetic anhydride.

In the first polymerization stage, the monomers are used in relation to the polymerization solvent in an amount such that initial prepolymer compositions having a polymer content of from 10 to 40% by weight, preferably from 13 to 20% by weight, are obtained. This does not include the amount of water added after the polymerization stage. The aqueous prepolymer composition (B), to which water has been added, is then used in the second stage of the polymerization. In the second stage of the polymerization, from 0.1 to 10, preferably from 0.8 to 3, parts by weight, based on 1 part by weight of the prepolymer, of a first ethylenically unsaturated monomer blend is used.

Preferably the first polymerization stage for the preparation of the aqueous prepolymer composition (B) is performed in the presence of at least one polymerization regulator. Suitable polymerization regulators include, for example, mercaptans, such as ethyl mercaptan, n-butyl mercaptan, tert-butyl mercaptan, n-dodecyl mercaptan and tetradodecyl mercaptan. When polymerization regulators are used, the amounts of the polymerization regulator is preferably from 0.1 to 10% by weight, preferably for 0.3 to 5% by weight. The polymers prepared in the first stage have a relatively low molar mass, e.g. Mw from 1000 to 100 000, preferably from 5000 to 50 000 (as determined by size exclusion chromatography). The determination of the molecular weight distribution and of the mass average molecular weight can be carried out by methods known to a person skilled in the art, such as, for example, gel permeation chromatography, light scattering or ultracentrifuging.

Monomers of group (i) include quaternary salts of N,N,N-tri($C_{1-4}$-alkyl)amino $C_{1-4}$-alkylacrylates, N,N,N-tri($C_{1-4}$-alkyl)amino $C_{1-4}$-alkylmethacrylates, N,N,N-tri($C_{1-4}$-alkyl)amino $C_{1-4}$-alkylacrylamides, N,N,N-tri($C_{1-4}$-alkyl)amino $C_{1-4}$-alkylmethacrylamides and mixtures thereof. The cationic groups may also originate from monomers selected from 2-(dimethylamino)ethyl acrylate benzylchloride, 2-(dimethylamino)ethyl acrylate dimethylsulphate, 2-dimethylaminoethyl methacrylate dimethylsulphate, and diallyldimethylammonium chloride. Preferably monomers of group (i) include quaternary salts of N,N,N-tri(C1-4-alkyl)amino C1-4-alkylacrylates, N,N,N-tri(C1-4-alkyl)amino C1-4-alkylmethacrylates and mixture thereof. Preferred examples of group (i) include quaternary salts of N,N,N-trimethylamino C1-4-alkylacrylates and N,N,N-trimethylamino C1-4-alkylmethacrylates with mineral acid, such as quaternary salts of N,N,N-trimethylamino ethyl(meth)acrylates with HCl. Particularly preferred monomers of group (i) are [2-(methacryloyloxy)ethyl]trimethylammonium chloride and [2-(acryloyloxy)ethyl]-trimethylammoniumchloride.

Monomers of group (ii) include, for example, tertiary amines N,N-di(C1-C4-alkyl)amino C1-C4-alkylacrylates, N,N-di(C1-C4-alkyl)amino C1-C4-alkylmethacrylates, N,N-di(C1-C4-alkyl)amino C1-C4-alkylacrylamides, N,N-di(C1-C4-alkyl)amino C1-C4-alkylmethacrylamides and mixtures thereof, preferably tertiary amines N,N-di(C1-C4-alkylamino C1-C4-alkylacrylates, N,N-di(C1-C4-alkyl)amino C1-C4-alkylmethacrylates and mixture thereof. Preferred examples of group (ii) include tertiary amines N,N-dimethylamino C1-4-alkylacrylates and N,N-dimethylamino C1-4-alkylmethacrylates, such as N,N-dimethylamino ethyl(meth)acrylates. Particularly preferred monomers of group (ii) are dimethylaminoethyl methacrylate, dimethylaminoethyl acrylate, and dimethylaminopropyl methacrylate.

The copolymerization in the first polymerization stage is effected in the presence of a second free radical initiator. Suitable second free radical initiators are, for example, azoinitiators such as 2,2'-azobis(2-methylpropionitrile), 2,2'-azobis(2-methylbutyronitrile), or dimethyl 2,2'-azobis (2-methyl propionate) or peroxides such as hydrogen peroxide, sodium peroxo-disulfate, potassium peroxodisulfate, ammonium peroxodisulfate, dibenzoyl peroxide, dilauroyl peroxide, di-tert-butyl peroxide, tert-butyl hydroperoxide, 1,1,3,3-tetramethylbutyl peroxy-2-ethylhexanoate, cumyl hydroperoxide or bis-cyclohexyl peroxydicarbonate. Preferably the second free radical initiator is 2,2'-azobis(2-methylpropionitrile), or 2,2'-azobis(2-methylbutyronitrile).

The copolymerization in the first polymerization stage may further be effected in the presences of a chain transfer agent. Suitable chain transfer agents are, for example, sulfur compounds, e.g. mercaptans, di and polysulfides, esters and sulfides of thio- and dithiocarboxylic acids and enol sulfides. Halogen compounds, aldehydes, ketones, formic acid, enol ethers, enamines, hydroxylamine, halogenated hydrocarbons, alcohols, ethylbenzene and xylene may also be used. Examples of regulators based on sulfur containing organic compounds include mercaptoethanol, mercaptopropanol, mercaptobutanol, thioglycolic acid, thioacetic acid, thiopropionic acid, 1-dodecanthiol, thioethanolamine, sodium dimethyidithiocarbamate, cysteine, ethyl thioglycolate, trimethylolpropane trithioglycolate, pentaerythrityl tetra (mercaptopropionate), pentaerythrityl tetrathioglycolate, trimethylolpropane tri(mercaptoacetate), butyl methylenebisthioglycolate, thioglycerol, glyceryl monothioglycolate, n-octadecyl mercaptan, n-dodecyl mercaptan, tert-dodecyl mercaptan, butyl mercaptan, thiophenol, mercaptotrimethoxysilane and acetylcysteine. Preferably the chain transfer agent is dodecyl mercaptane.

The first polymerization stage can be carried out both by a feed process and by a batch process at temperatures from 110 to 150° C., preferably from 115 to 130° C. If the polymerization temperature should be above the boiling point of the solvent used, the polymerization is carried out under superatmospheric pressure, for example in an autoclave equipped with a stirrer.

The first polymerization stage is completed by addition of water to provide the produced prepolymer as an aqueous prepolymer composition, either in a form of dispersion or solution. The concentration of the prepolymer prepared in the first polymerization stage in the aqueous prepolymer composition (B), into which water has been added is, for example, from 10 to 40% by weight, preferably from 13 to 20% by weight.

The obtained aqueous prepolymer composition (B) is then subjected to the second polymerization stage where it is copolymerized with a first ethylenically unsaturated monomer blend in the presence of (first) free radical initiators which form free radicals under the polymerization conditions to obtain the desired aqueous polymer dispersion (A).

Examples of suitable monomers of group (a) and the group (iii) may be selected from styrene and substituted styrenes, such as α-methylstyrene, vinyltoluene, ethylvinyltoluene, chloromethylstyrene, and mixtures thereof.

Examples of suitable monomers of group (b) and the group (iv) may be selected from C1-C4-alkyl acrylates, C1-C4-alkyl methacrylates, or mixtures thereof, such as n-butyl acrylate, iso-butyl acrylate, tort-butyl acrylate, and 2-butyl acrylate, and the corresponding butyl methacrylates: n-butyl methacrylate, iso-butyl methacrylate, tort-butyl methacrylate, and 2-butyl methacrylate, and furthermore methyl acrylate, methyl methacrylate, ethyl acrylate, ethyl methacrylate, propyl acrylate, or propyl methacrylate. The monomers may also be used in any combination. The monomers of group (b) and the group (iv), respectively, may each be a mixture of at least two isomeric butyl acrylates. The monomer component (b) may be tert-butyl acrylate and/or tert-butyl methacrylate. The monomer component of the group (iv) may be tert-butyl acrylate and/or tert-butyl methacrylate.

Suitable monomers of the group (c) and the group (v) may be selected from further ethylenically unsaturated monomers, such as ethylhexyl acrylate, stearyl acrylate, stearyl methacrylate, and further esters of acrylic and methacrylic acid with alcohols which have more than four C atoms, and furthermore acrylonitrile, methacrylonitrile, acrylamide, vinyl acetate or anionic comonomers, such as acrylic acid, methacrylic acid, styrenesulphonic acid.

Particularly preferred monomers of group (d) may be selected from acrylic acid, and/or styrenesulphonic acid.

The monomers of the first polymer blend are chosen in the second polymerization stage so that the glass transition temperature of the resulting copolymer is from −15 to +80° C. Preferably the glass transition temperature of the copolymer in the second polymerization stage is from 25 to 75° C.

The first ethylenically unsaturated monomer blend may comprise up to 75% by weight of monomer(s) of group (a) of the total weight of the first ethylenically unsaturated monomer blend. However, the presence monomers of group (a) is not required. Thus the amount of monomer(s) of group (a) may be 0%. Preferably the amount of monomers) of group (a) is 0 to 50% by weight, more preferably 5 to 45% by weight, of the total weight of the first ethylenically unsaturated monomer blend.

The first ethylenically unsaturated monomer blend may comprise up to 100% by weight of monomer(s) of group (b) of the total weight of the first ethylenically unsaturated monomer blend.

The prevailing monomer(s) of the first ethylenically unsaturated monomer blend may be either monomers) of group (a) or monomers) of group (b). Preferably the amount of monomer(s) of group (b) is over 50%, more preferably from 50 to 100% by weight, even more preferably 55 to 95% by weight, of the total weight of the first ethylenically unsaturated monomer blend.

The first ethylenically unsaturated monomer blend may also comprise up to 10% by weight of monomer(s) of group (c) of the total weight of the first ethylenically unsaturated monomer blend. However the presence monomer(s) of group (c) is not required. Thus preferably the amount of monomer(s) of group (c) is 0%.

The second polymerization stage is carried out as a rule by a procedure wherein the monomers of the first monomer blend, either individually or as a mixture, and the free radical initiators suitable for initiating the polymerization are added to the aqueous prepolymer composition (B).

The second polymerization stage can be carried out either by a feed process and by a batch process at temperatures from 40 to 105° C., preferably from 50 to 100° C. If the polymerization temperature should be above the boiling point of the solvent used, the polymerization is carried out under superatmospheric pressure, for example in an autoclave equipped with a stirrer.

Both polymerization stages are usually carried out in the absence of oxygen, preferably in an inert gas atmosphere, for example under nitrogen. During the polymerization, thorough mixing with the aid of a suitable stirrer should be ensured.

In the second polymerization stage a water-soluble redox system is utilized for initiating the polymerization. The oxidant of the redox system can be for example, hydrogen peroxide, sodium peroxo-disulfate, potassium peroxodisulfate, ammonium peroxodisultate. The reductant can be for example reducing agent such as sodium sulfite, sodium pyrosulfite, sodium bisulfite, sodium dithionite, sodium hydroxymethanesulfinate or ascorbic acid, or metal salt such as cerium, manganese or iron(II) salt. Preferably hydrogen peroxide is utilized as the first free-radical initiator. Suitable water-soluble initiator systems include redox systems comprising as a redox system hydrogen peroxide and metal ions such as cerium, manganese or iron(II) salts. A redox system comprising hydrogen peroxide and an iron(II) salt, such as iron(II)sulfate, gives fine-particled dispersions.

In the second polymerization stage polymerization is usually carried out in such a way that the metal salt of the redox system, such as, for example, the iron(II) salt, is added to the batch before the polymerization, while hydrogen peroxide is added in simultaneously with the monomers but separately. Iron(II) salt is usually used in concentrations of 5 to 200 mg/L. $Fe^{++}$ ion, based on the total dispersion, higher or lower concentrations also being possible. Hydrogen peroxide (calculated as 100%) is added in concentrations of 0.2 to 2.0% by weight, based on monomer.

Polymerization with the redox system comprising hydrogen peroxide and metal ions gives fine-particled dispersions having a good sizing effect.

Completion of the polymerization may be ensured for example by addition of an oil-soluble, sparingly water-soluble free radical initiator. The oil-soluble, sparingly water-soluble free radical initiators are preferably added continuously during the addition of the second monomer batch for subsequent activation after the polymerization with the water-soluble redox system, and the polymerization is completed therewith.

Suitable oil-soluble, sparingly water-soluble free radical initiators are, for example, customary organic peroxides, such as dibenzoyl peroxide, di-tert-butyl peroxide, tert-butyl hydroperoxide, cumyl hydroperoxide or bis-cyclohexyl peroxydicarbonate. Here, sparingly water-soluble is intended to mean that less than 1% of the organic peroxide is completely soluble in water at room temperature.

In this case, polymerization is first carried out, for example, with hydrogen peroxide and iron(II)sulfate, based on monomer used, and, for example, an oil-soluble, sparingly water-soluble organic peroxide is then added for subsequent activation, it being possible to achieve a conversion >99.8% and a residual monomer content<100 ppm and to dispense with monomer removal.

The copolymerization in the second polymerization stage may further be effected in the presences of a chain transfer agent. Suitable chain transfer agents are, for example, sulfur compounds, e.g. mercaptans, di and polysulfides, esters and sulfides of thio- and dithiocarboxylic acids and enol sulfides. Halogen compounds, aldehydes, ketones, formic acid, enol ethers, enamines, hydroxylamine, halogenated hydrocarbons, alcohols, ethylbenzene and xylene may also be used. Examples of regulators based on sulfur containing organic compounds include mercaptoethanol, mercaptopropanol, mercaptobutanol, thioglycolic acid, thioacetic acid, thiopropionic acid, 1-dodecanthiol, thioethanolamine, sodium dimethyidithiocarbamate, cysteine, ethyl thioglycolate, trimethylolpropane trithioglycolate, pentaerythrityl tetra (mercaptopropionate), pentaerythrityl tetrathioglycolate, trimethylolpropane tri(mercaptoacetate), butyl methylenebisthioglycolate, thioglycerol, glyceryl monothioglycolate, n-octadecyl mercaptan, n-dodecyl mercaptan, tert-dodecyl mercaptan, butyl mercaptan, thiophenol, mercaptotrimethoxysilane and acetylcysteine. Preferably the chain transfer agent is dodecyl mercaptane.

The concentration of polymer in the obtained aqueous polymer dispersion (A) is typically between 10 and 50% by weight, preferably between 20 and 40% by weight.

The obtained aqueous polymer dispersion (A) has a very small particle size of D50 of less than 90 nm, preferably from 80 to 10 nm, more preferably from 60 to 10 nm, most preferably from 40 to 10 nm. D90 is less than 150 nm, preferably from 130 to 10 nm, more preferably from 110 to 10 nm and most preferably from 90 to 10 nm. The particle size can be determined, for example, by laser correlation spectroscopy or by turbidity measurement.

The present surface sizing composition comprises a metal salt, wherein the metal of said metal salt may be selected from the group of metals which have at least 3 valence electrons, for example manganese, iron and aluminium, and any combination thereof. The metal salt may for example be selected from the group of carbonates, formiates, acetates, nitrates, sulfates, bromides, and chlorides, and any combination thereof. Examples of metal salts are selected from the group aluminium sulfate, alum, aluminium chloride, aluminium nitrate, polyaluminium sulfate (PAS), polyaluminium chloride (PAC), and polyaluminium chloride sulfate (PACS), polyaluminium formiate, polyaluminum nitrate, and any combination thereof. Preferred metal salts are polyaluminium sulfate, aluminium sulfate, and/or polyaluminium chloride.

The surface sizing composition may further comprise alkylketene dimer (AKD) or rosin.

The metal salt may constitute 0.1-70% by weight of dry content of the surface sizing composition, preferably 0.5-65% by weight of dry content of the surface sizing composition, more preferably 1-55% by weight of dry content of the surface sizing composition and most preferably 5-45% by weight of dry content of the surface sizing composition. The dry content of the surface sizing composition is herein the dry content of the metal salt and polymer dispersion.

The surface sizing composition comprising the metal salt and the aqueous polymer dispersion may have a viscosity≤5-500 mPas, preferably in the range of 0.5-500 mPas, preferably 1-100 mPas, more preferably 1-50 mPas, most preferably 1.5-30 mPas after being stored 1 week at 40° C., preferably 4 weeks at 40° C., and more preferably 12 weeks at 40° C., measured at 25° C., by using Brookfield LVDV viscometer with spindle 18 and using the highest feasible rotation speed for the spindle.

The surface sizing composition comprising the metal salt, the aqueous polymer dispersion, and the AKD and/or rosin may have viscosity≤500, preferably in the range of 0.5-500 mPas, preferably 1-100 mPas, more preferably 1-50 mPas, most preferably 1.5-30 mPas after being stored 1 week at 40° C., and preferably 4 weeks at 40° C., measured at 25° C., by using Brookfield LVDV viscometer with spindle 18 and using the highest feasible rotation speed for the spindle.

The surface sizing composition comprising the metal salt and the aqueous polymer dispersion may have a particle size of D50 of less than 100 nm, preferably from 90 to 10 nm, more preferably from 70 to 10 nm and most preferably from 50 to 11 nm after being stored 1 week at 40° C., preferably 4 weeks at 40° C., and more preferably 12 weeks at 40° C.

The surface sizing composition comprising the metal salt, the aqueous polymer dispersion, and the AKD and/or rosin may have a particle size of D50 of less than 200 nm, preferably from 190 to 10 nm, more preferably from 140 to 10 nm and most preferably from 90 to 10 nm after being stored 1 weeks at 40° C., and preferably 4 weeks at 40° C.

The surface sizing composition may further comprise natural or modified polysaccharides, or derivatives thereof. The polysaccharides may be selected from the group of starches. The starch may be modified, for example, degraded, oxidized, cationized, dextrin, or otherwise derivatized starch or treated with a combination of the different starch treatments.

Provided herein is a surface sizing composition comprising an aqueous polymer dispersion and a metal salt as defined herein. The surface sizing composition is typically provided in an aqueous liquid vehicle, as an aqueous solution or dispersion, although small amounts of water-soluble or water miscible organic solvent(s) may also be present. The surface sizing composition solution typically includes, along with the sizing compounds, starch. Typically the aqueous dispersion is applied on the surface in a starch solution. The starch may be modified, for example, degraded, oxidized, cationized, dextrin, or otherwise derivatized starch or treated with a combination of the different starch treatments. The starch concentration is preferably from 1% to 30%, more preferably from 5 to 25% and the sizing agent, concentration is from 0.1 to 20% by weight, preferably 0.5 to 5.0% by weight, based on the weight of dry starch.

The surface sizing composition disclosed herein also may be used in conjunction with or serially with other additives conventionally used in the production of paper and other cellulosic products. Such additional additives commonly known in the art include, but are not limited to, dispersing agents, antifoaming agents, colorants, inorganic pigments and fillers, anti-curl agents, additional conventional components such as surfactants, plasticizers, humectants, defoamers, UV absorbers, light fastness enhancers, polymeric dispersants, dye mordants, optical brighteners, leveling agents, rheology Modifiers, and strength additives, to enhance the sizing performance, and improve runnability of a size press, and otherwise adjust the surface properties.

The present surface sizing compositions are suitable for surface sizing of cellulosic products, in particular all paper and paper board qualities produced in practice, which may be unsized or may be presized in the paper pulp, for example with alkylketene dimer, alkenylsuccinic anhydride or rosin.

The specific techniques used to size paper and other cellulosic products such as cardboard, include, but are not limited to, those techniques that are commonly employed in papermaking to apply the sizing composition to the cellulose-based product. The surface sizing composition may be provided as a liquid or a foam onto the cellulose-based product. For instance, the aqueous sizing composition may be applied to the surface of the paper using a puddle or film size press or a size press by using a calender or a doctor knife blade. Alternatively, the sizing composition may be sprayed onto the paper web or be applied by dipping the paper into the aqueous surface sizing composition. Paper or other cellulosic product treated with the surface sizing solution is then dried at elevated temperatures, typically temperature of the paper is from 80 to 110° C.

Drying the paper web is typically sufficient to bring the surface size and surface strength to full development.

The present invention further provides a method of surface sizing a cellulosic product, in particular paper, board or cardboard, comprising applying, typically to at least one surface of the cellulosic product, a sizing composition comprising an aqueous polymer dispersion and metal salt as defined herein. Further accordingly provided herein is a paper surface-sized with surface sizing composition as defined herein.

Accordingly further provided herein is a cellulosic product surface-sized with a surface sizing composition comprising an aqueous polymer dispersion and a metal salt as defined herein.

The paper, paper board or other cellulosic product onto which the surface sizing composition comprising the present aqueous polymer dispersions is applied may vary widely and is independent of the kind of pulp used to make the paper. Surface sizing compositions comprising the aqueous polymer dispersions and metal salt disclosed herein are suitable for the preparation of sized paper of any thickness and of any kind and thus applicable to papers or cardboards obtained from any specific paper pulp and mixtures thereof.

The present compositions are particularly suitable for surface sizing cellulosic products when the cellulosic product comprises recycled fiber.

The paper or other cellulosic product also may contain additives such as fillers, dyestuffs, paper strengthening agents, drainage rate improvers, and internal sizing agents.

Water absorptiveness of paper surface sized with the present surface size composition can be determined using the Cobb 60 method, ISO 535:1991(E), at 23° C., 50% relative humidity.

The present composition product may be used in papermaking. The present invention provides a method of producing a paper product, comprising the steps of:
- providing a surface sizing composition according to the present invention,
- applying said composition onto a paper product after a headbox of a papermaking process.

Said composition may be applied at the sheet forming. The composition may be applied at or after initiation of sheet forming, such as at a size press.

The present surface sizing composition may be used for surface sizing a cellulosic product. The surface sizing composition may be used in a papermaking process. The surface sizing composition may be sprayed onto a cellulosic product, such as a paper sheet.

The present invention provides a cellulosic product surface sized with said surface sizing composition. Said cellulosic product may be selected from paper, board, cardboard, carton, linerboard, and fiberboard.

EXAMPLES

The particle size of the surface sizing compositions was measured using Zetasizer Nano-device. The solids contents were measured using a Mettler Toledo Halogen moisture analyzer. The viscosities were measured at 25° C., with Brookfield LVDV viscometer, in a small sample adapter with spindle 18, 60 rpm. The viscosity of the comparative examples 1 and 2 was over the measuring range of spindle 18, 60 rpm. They were measured at 25° C., with Brookfield LVDV viscometer with spindle 31. The comparative example 1 with 30 rpm, and the comparative example 2 with 0.3 rpm. The viscosity result OMR was over measurement range of spindle 31, 0.3 rpm or, because of the high viscosity, the sample could not be inserted uniformly to the small sample adapter to have a reliable result. When the particle size D50 result was Not Measurable, the sample could not be dispersed for the measurement to have a reliable result on the measuring range of Zetasizer Nano.

Example 1

Formulate of Quaternary Amine Polymer Dispersion with PAC

The 40 g of 30% quaternary amine groups containing poly(styrene butyl acrylate) dispersion was placed in a glass reactor. To the stirring dispersion was added 50 g of water, and subsequently 10 g of 18% poly(aluminium chloride) solution. pH of the solution was adjusted to 3.3 with sodium hydroxide solution. The mixture was stirred 20 minutes at room temperature. The solids content of the formulation was 14%.

Example 2

Formulate of Quaternary Amine Polymer Dispersion with Aluminum Sulfate

The 70 g of 30% quaternary amine groups containing poly(styrene butyl acrylate) dispersion was placed in a glass reactor. To the stirring dispersion was added 30 g of 39% aluminium sulfate solution. pH of the solution was adjusted to 3.3 with sodium hydroxide solution. The mixture was stirred 20 minutes at room temperature. The solids content of the formulation was 33%.

Example 3

Formulate of Quaternary Amine Polymer Dispersion with Aluminium Sulfate and AKD Dispersion The 62.5 g of 30% quaternary amine groups containing poly(styrene butyl acrylate) dispersion was placed in a glass reactor. To the stirring dispersion was added 4 g of water, 5 g of 39% aluminium sulfate solution, and 33.5 g of 17% AKD dispersion. pH of the solution was adjusted to 3.3 with sodium hydroxide solution. The mixture was stirred 20 minutes at room temperature. The solids content of the formulation was 25%.

Comparative Example 1

Formulate of Tertiary Amine Polymer Dispersion with PAC

The 40 g of 30% tertiary amine groups containing poly(styrene butyl acrylate) dispersion was placed in a glass reactor. To the stirring dispersion was added 50 g of water, and subsequently 10 g of 18% poly(aluminium chloride) solution. pH of the solution was adjusted to 3.3 with sodium hydroxide solution. The mixture was stirred 20 minutes at room temperature. The solids content of the formulation was 14%.

Comparative Example 2

Formulate of Tertiary Amine Polymer Dispersion with Aluminium Sulfate

The 70 g of 30% tertiary amine groups containing poly(styrene butyl acrylate) dispersion was placed in a glass reactor. To the stirring dispersion was added 30 g of 39% aluminium sulfate solution. pH of the solution was adjusted to 3.3 with sodium hydroxide solution. The mixture was stirred 20 minutes at room temperature. The solids content of the formulation was 33%.

Comparative Example 3

Formulate of Tertiary Amine Polymer Dispersion with Aluminium Sulfate and AKD Dispersion The 62.5 g of 30% tertiary amine groups containing poly(styrene butyl acrylate) dispersion was placed in a glass reactor. To the stirring dispersion was added 4 g of water, 5 g of 39% aluminium sulfate solution, and 33.5 g of 17% AKD dispersion. pH of the solution was adjusted to 3.3 with sodium hydroxide solution. The mixture was stirred 20 minutes at room temperature. The solids content of the formulation was 25%.

TABLE 1

| | | After the preparation | | 24 hours after the preparation. Stored at 40° C. | | 1 week after the preparation. Stored at 40° C. | | 4 weeks after the preparation. Stored at 40° C. | | 12 weeks after the preparation. Stored at 40° C. | |
|---|---|---|---|---|---|---|---|---|---|---|---|
| | | Viscosity mPas | D50 nm | Viscosity mPas | D50 nm | Viscosity mPas | D50 nm | Viscosity mPas | D50 nm | Viscosity mPas | D50 nm |
| Example 1 | Formulate of quaternary amine polymer dispersion with PAC | 2 | 26 | | | 3 | 34 | 3 | 36 | 3 | 33 |
| Example 2 | Formulate of quaternary amine polymer dispersion with aluminium sulfate | 7 | 27 | | | 5 | 29 | 5 | 31 | 8 | 33 |
| Example 3 | Formulate of quaternary amine polymer dispersion with aluminium sulfate and AKD dispersion | 5 | 27 | 13 | 36 | 15 | 38 | 25 | 34 | | |
| Comparative Example 1 | Formulate of tertiary amine polymer dispersion with PAC | 935 | 26 | OMR | 275 | OMR | not measurable | OMR | not measurable | OMR | not measurable |
| Comparative Example 2 | Formulate of tertiary amine polymer dispersion with aluminium sulfate | 95200 | 35 | OMR | 194 | OMR | not measurable | OMR | not measurable | OMR | not measurable |
| Comparative Example 3 | Formulate of tertiary amine polymer dispersion with aluminium sulfate and AKD dipersion | 14 | 41 | OMR | 249 | OMR | not measurable | OMR | not measurable | OMR | not measurable |

Cationic Formulations for Sizing Tests

The surface sizes and formulations were tested for the surface size application using an internally unsized, recycled fiber linerboard with base weight of ca 110 g/m$^2$. A Mathis size press was used for these tests. The surface size formulation was added to surface size starch (C*film 07312) solution at 10% solids content. Hydrophobic polymers were added at concentrations of 2, 4 and 6 weight-%. Sizing tests were carried out at 60° C. temperature. Temperature of the size press nip was measured with Reatec NO1 temperature indicator strips and temperature of the water bath for size press rolls was adjusted to obtain the desired temperature. The sheets were run through a horizontal pond size press at 2 m/min (2 Bar). The sheets were dried at 95° C. using a drum dryer. Temperature of the dryers was adjusted using Reatec NO82 temperature indicator strips. The sizing efficiency was determined by measuring Cobb60 sizing degree according to standard ISO 535.

FIG. 1 shows water absorptiveness of paper surface sized with the quaternary amine groups containing poly(styrene butyl acrylate) dispersion alone, and in the formulate with PAC according to the example 1. The sizing results disclosed relates to use of the present aqueous polymer dispersion (cationic polystyrene acrylate based surface sizing agent (SAE), with quaternary amine acrylates) and present surface sizing agent (formulation of SAE and PAC). The PAC dose is not included in the dose calculation of the polymeric size. In the results, a lower Cobb value means better the sizing performance. The graph shows better sizing performance for the use of the present surface sizing agent compared to the quaternary sizing polymer alone up to Cobb level of 35 g/m$^2$.

Figure 2:
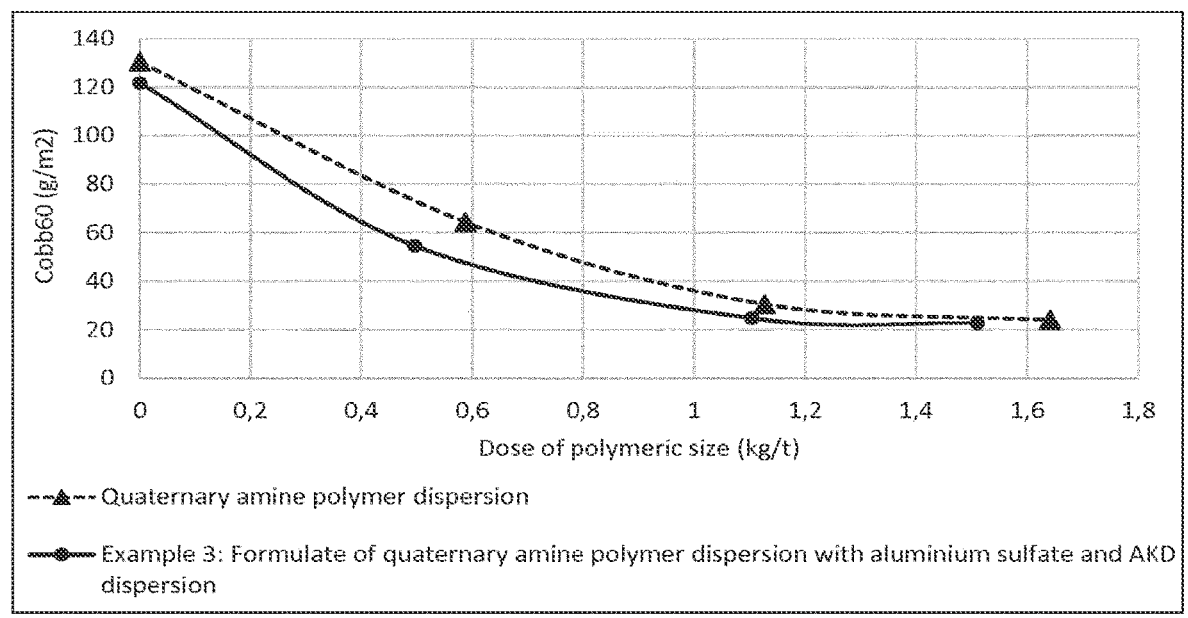
FIG. 2 shows sizing results of the quaternary amine polymer dispersion, and the formulate of the quaternary amine polymer dispersion with aluminium sulfate and alkyl ketene dimer (AKD) dispersion. AKD is included in the dose calculation of the polymeric size.

FIG. 2 shows the sizing results of using SAEs with quaternary amine groups containing poly(styrene butyl acrylate) dispersion alone, and the formulate with aluminium sulfate, and alkyl ketene dimer (AKD) according to the example 3. It is to be noted that AKD emulsions contain aluminium sulfates. AKD is included in the dose calculation of the polymeric size. As a low Cobb value means better sizing performance, the FIG. 2 clearly indicate the combined formulation to showing better sizing performance than the quaternary sizing polymer alone.

The invention claimed is:

1. A method of producing a surface sizing composition, the method comprising:
   providing a metal salt, wherein the metal has at least 3 valence electrons, wherein the metal salt is selected from the group of aluminium sulfate, aluminium chloride, aluminium nitrate, polyaluminium sulfate (PAS), polyaluminium chloride (PAC), and polyaluminium chloride sulfate (PACS), polyaluminium formiate, polyaluminium nitrate, and any combination thereof;
   providing an aqueous polymer dispersion, wherein the aqueous polymer dispersion is an aqueous polymer dispersion (A) and an aqueous prepolymer composition (B),
   wherein the aqueous polymer dispersion (A) is obtainable by free radical emulsion copolymerizing a first ethylenically unsaturated monomer blend comprising
   (a) 0 to 75% by weight of at least one optionally substituted styrene,
   (b) 15 to 100% by weight of at least one C1-C4-alkyl (meth)acrylate, and
   (c) 0 to 10% by weight of other ethylenically unsaturated copolymerizable monomers,
   wherein the sum (a)+(b)+(c) is 100%,
   in the presence of a water-soluble redox system comprising a first free radical initiator for the free radical emulsion copolymerization and
   wherein the aqueous prepolymer composition (B) is obtainable by free radical emulsion copolymerizing in a polymerization solvent comprising C1-6-carboxylic acid and C1-6-carboxylic acid anhydride, a second ethylenically unsaturated monomer blend comprising (i) 5 to 50% by weight of at least one ethylenically unsaturated quaternary amine selected from quaternary salt of N,N,N-tri(C1-4-alkyl)amino C1-4-alkyl (meth)acrylate with a mineral acid or an organic acid and/or quaternary salt of N,N,N-tri(C1-4-alkyl) amino C1-4-alkyl(meth)acrylamide with a mineral acid or an organic acid, (ii) 0 to 40% by weight of at least one ethylenically unsaturated tertiary amine selected from N,N-di(C1-4-alkyl)amino C1-4-alkyl(meth)acrylate and/or N,N-di(C1-4-alkyl)amino C1-4-alkyl(meth)acrylamide, (iii) 10 to 95% by weight of at least one optionally substituted styrene, (iv) 0 to 50% by weight of at least one C1-C4-alkyl (meth)acrylate, and (v) 0 to 10% by weight of other ethylenically unsaturated copolymerizable monomers, wherein the sum (i)+(ii)+(iii)+(iv)+(v) is 100%, in the presence of a second free radical initiator, and adding water to the obtained polymer dispersion to obtain the aqueous prepolymer composition (B); and mixing the metal salt and the aqueous polymer dispersion to provide a surface sizing composition to be used in papermaking.

2. The method according to claim 1, wherein the aqueous polymer dispersion is obtained by:

free radical emulsion polymerizing, in a polymerization solvent comprising C1-6-carboxylic acid and C1-6-carboxylic acid anhydride, in the presence of a second free radical initiator, a second ethylenically unsaturated monomer blend comprising (i) 5 to 50% by weight of at least one ethylenically unsaturated quarternary amine selected from quaternary salt of N,N,N-tri(C1-4-alkyl)amino C1-4-alkyl (meth)acrylate with a mineral acid or an organic acid and/or quaternary salt of N,N,N-tri(C1-4-alkyl)amino C1-4-alkyl(meth)acrylamide with a mineral acid or an organic acid, (ii) 0 to 40% by weight of at least one ethylenically unsaturated tertiary amine selected from N,N-di(C1-4-alkyl)amino C1-4-alkyl(meth)acrylate and/or N,N-di (C1-4-alkyl)amino C1-4-alkyl(meth)acrylamide, (iii) 10 to 95% by weight of at least one optionally substituted styrene, (iv) 0 to 50% by weight of at least one C1-C4-alkyl (meth)acrylate, and (v) 0 to 10% by weight of other ethylenically unsaturated copolymerizable monomers, wherein the sum (i)+(ii)+(iii)+(iv)+(v) is 100%, adding water to the obtained polymer composition to obtain an aqueous prepolymer composition (B) and copolymerizing in the presence of said aqueous prepolymer composition (B) and a water-soluble redox system comprising a first free radical initiator for the free radical emulsion copolymerization a first ethylenically unsaturated monomer blend comprising (a) 0 to 75% by weight of at least one optionally substituted styrene, (b) 15 to 100% by weight of at least one C1-C4-alkyl (meth)acrylate, and (c) 0 to 10% by weight of other ethylenically unsaturated copolymerizable monomers, wherein the sum (a)+(b)+(c) is 100%, to obtain the aqueous polymer dispersion (A).

3. A method of producing a paper product, comprising: providing a surface sizing composition comprising:

a metal salt, wherein the metal has at least 3 valence electrons, wherein the metal salt is selected from the group of aluminium sulfate, aluminium chloride, aluminium nitrate, polyaluminium sulfate (PAS), polyaluminium chloride (PAC), and polyaluminium chloride sulfate (PACS), polyaluminium formiate, polyaluminium nitrate, and any combination thereof; and an aqueous polymer dispersion, wherein the aqueous polymer dispersion is an aqueous polymer dispersion (A) and an aqueous prepolymer composition (B), wherein the aqueous polymer dispersion (A) is obtainable by free radical emulsion copolymerizing a first ethylenically unsaturated monomer blend comprising (a) 0 to 75% by weight of at least one optionally substituted styrene, (b) 15 to 100% by weight of at least one C1-C4-alkyl (meth)acrylate, and (c) 0 to 10% by weight of other ethylenically unsaturated copolymerizable monomers, wherein the sum (a)+(b)+(c) is 100%, in the presence of a water-soluble redox system comprising a first free radical initiator for the free radical emulsion copolymerization and wherein the aqueous prepolymer composition (B) is obtainable by free radical emulsion copolymerizing in a polymerization solvent comprising C1-6-carboxylic acid and C1-6-carboxylic acid anhydride, a second ethylenically unsaturated monomer blend comprising (i) 5 to 50% by weight of at least one ethylenically unsaturated quaternary amine selected from quaternary salt of N,N,N-tri(C1-4-alkyl)amino C1-4-alkyl(meth)acrylate with a mineral acid or an organic acid and/or quaternary salt of N,N,N-tri (C1-4-alkyl)amino C1-4-alkyl(meth)acrylamide with a mineral acid or an organic acid, (ii) 0 to 40% by weight of at least one ethylenically unsaturated tertiary amine selected from N,N-di (C1-4-alkyl)amino C1-4-alkyl(meth)acrylate and/or N,N-di(C1-4-alkyl)amino C1-4-alkyl(meth) acrylamide, (iii) 10 to 95% by weight of at least one optionally substituted styrene, (iv) 0 to 50% by weight of at least one C1-C4-alkyl (meth)acrylate, and (v) 0 to 10% by weight of other ethylenically unsaturated copolymerizable monomers, wherein the sum (i)+(ii)+(iii)+(iv)+(v) is 100%, in the presence of a second free radical initiator, and adding water to the obtained polymer dispersion to obtain the aqueous prepolymer composition (B); and applying the surface sizing composition onto a paper product after a headbox of a papermaking process.

4. The method according to claim 3, wherein the surface sizing composition is applied at or after initiation of sheet forming.

5. A method of using a surface sizing composition produced according to claim 1 for surface sizing a cellulosic product, the method comprising applying the surface sizing composition to the cellulosic product.

6. A method of using a surface sizing composition produced according to claim 1 for papermaking, the method comprising applying the surface sizing composition to a paper product after a headbox of a papermaking process.

7. A cellulosic product surface sized with a surface sizing composition produced according to claim 1.

8. The cellulosic product according to claim 7, wherein the cellulosic product is selected from the group consisting of paper, board, cardboard, carton, linerboard, and fiberboard.

* * * * *